US012598490B2

(12) United States Patent
Stirling et al.

(10) Patent No.: US 12,598,490 B2
(45) Date of Patent: Apr. 7, 2026

(54) CONCURRENT VISUALIZATION OF TIME-SERIES NETWORK METRICS FOR CORRELATION INFERENCE

(71) Applicant: Cisco Technology, Inc., San Jose, CA (US)

(72) Inventors: Timothy Simon Stirling, Gilly (CH); Federico Lovison, Fontanelle (IT); Simone Lippolis, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 18/218,336

(22) Filed: Jul. 5, 2023

(65) Prior Publication Data

US 2025/0016591 A1     Jan. 9, 2025

(51) Int. Cl.

| | |
|---|---|
| *H04L 41/00* | (2022.01) |
| *H04L 41/22* | (2022.01) |
| *H04L 43/045* | (2022.01) |
| *H04L 43/067* | (2022.01) |
| *H04W 16/18* | (2009.01) |
| *H04W 16/22* | (2009.01) |
| *H04W 24/08* | (2009.01) |
| *H04W 24/10* | (2009.01) |
| *H04W 84/02* | (2009.01) |
| *H04W 88/08* | (2009.01) |
| *H04W 88/12* | (2009.01) |
| *H04W 88/18* | (2009.01) |
| *H04W 92/12* | (2009.01) |

(52) U.S. Cl.
CPC ............. *H04W 24/08* (2013.01); *H04L 41/20* (2013.01); *H04L 41/22* (2013.01); *H04L 43/045* (2013.01); *H04L 43/067* (2013.01); *H04W 16/18* (2013.01); *H04W 16/22* (2013.01); *H04W 24/10* (2013.01); *H04W 84/02* (2013.01); *H04W 88/08* (2013.01); *H04W 88/12* (2013.01); *H04W 88/18* (2013.01); *H04W 92/12* (2013.01)

(58) Field of Classification Search
CPC ......... H04B 17/0082–409; H04L 41/02–5096; H04L 43/02–55; H04W 16/02–32; H04W 24/02–10; H04W 28/02–26; H04W 80/02–12; H04W 84/005–22; H04W 88/005–188; H04W 92/02–24
See application file for complete search history.

(56) References Cited

U.S. PATENT DOCUMENTS

| | | | |
|---|---|---|---|
| 10,075,509 | B2 | 9/2018 | Baron et al. |
| 10,546,022 | B2 | 1/2020 | Raghavendra et al. |
| 11,277,315 | B2 | 3/2022 | Patel et al. |
| 11,316,763 | B1 | 4/2022 | Chitalia et al. |
| 11,418,538 | B2 | 8/2022 | Hutchinson et al. |
| 11,509,552 | B2 | 11/2022 | Haddow et al. |

(Continued)

*Primary Examiner* — Timothy J Weidner

(74) *Attorney, Agent, or Firm* — Lee & Hayes, P.C.

(57) ABSTRACT

In one embodiment, a device obtains telemetry data indicative of a plurality of different types of events that occurred in a network. The device computes event counts for each of the plurality of different types of events within each of a sequence of predefined timespans based on the telemetry data and generates timeseries for each of the plurality of different types of events using the event counts. The device provides display data that causes a user interface to display a selected two or more of the timeseries concurrently.

18 Claims, 7 Drawing Sheets

(56)         References Cited

U.S. PATENT DOCUMENTS

2005/0227625 A1*   10/2005   Diener  ................... H04B 17/23
2007/0043861 A1*    2/2007   Baron  ................ H04L 41/0631
2019/0320329 A1*   10/2019   Gódor  ................... H04W 24/08

* cited by examiner

100

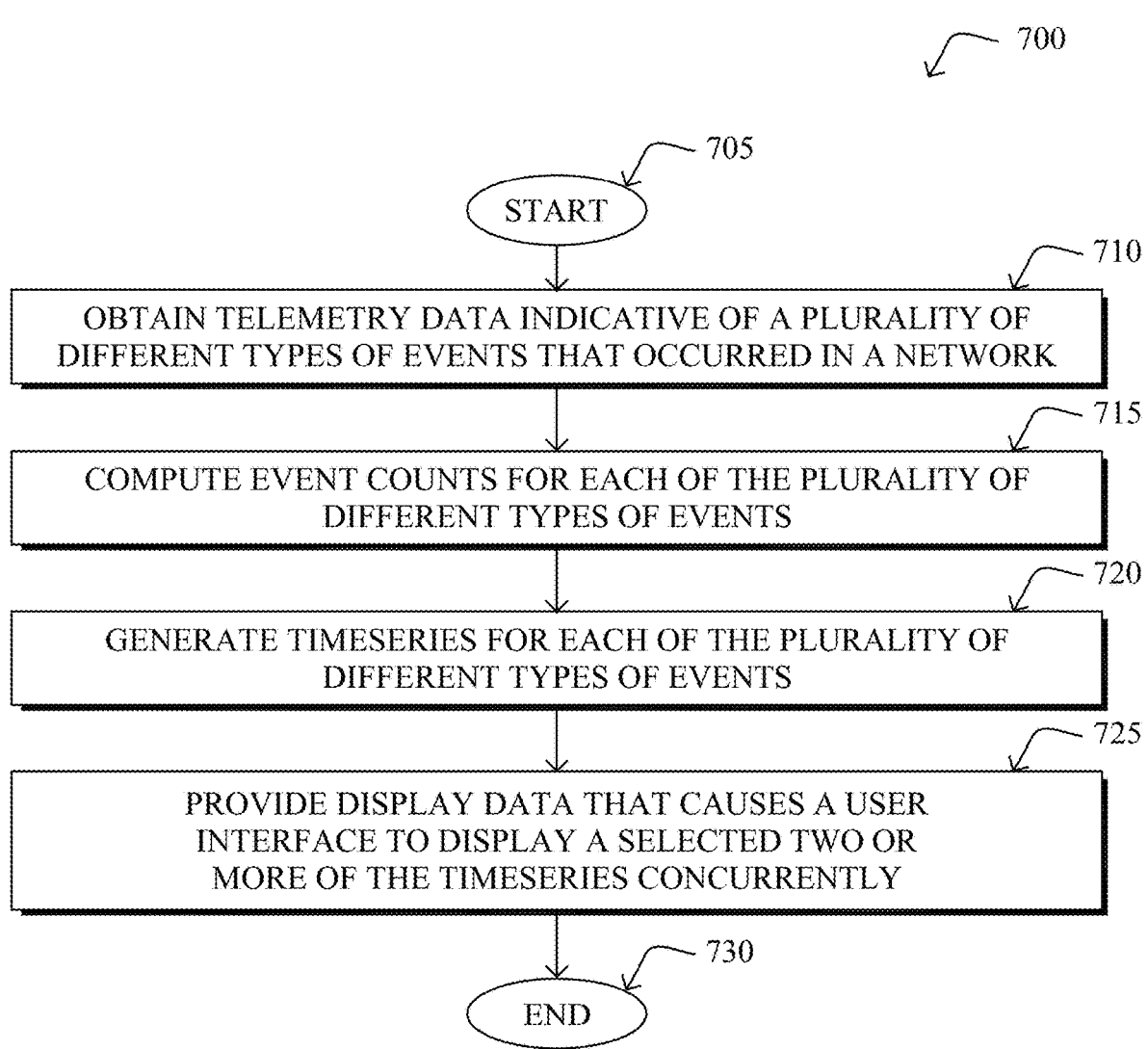

700

705

START

710

OBTAIN TELEMETRY DATA INDICATIVE OF A PLURALITY OF DIFFERENT TYPES OF EVENTS THAT OCCURRED IN A NETWORK

715

COMPUTE EVENT COUNTS FOR EACH OF THE PLURALITY OF DIFFERENT TYPES OF EVENTS

720

GENERATE TIMESERIES FOR EACH OF THE PLURALITY OF DIFFERENT TYPES OF EVENTS

725

PROVIDE DISPLAY DATA THAT CAUSES A USER INTERFACE TO DISPLAY A SELECTED TWO OR MORE OF THE TIMESERIES CONCURRENTLY

730

END

FIG. 7

CONCURRENT VISUALIZATION OF TIME-SERIES NETWORK METRICS FOR CORRELATION INFERENCE

TECHNICAL FIELD

The present disclosure relates generally to computer networks, and, more particularly, to concurrent visualization of time-series network metrics for correlation inference.

BACKGROUND

Collection and analysis of network telemetry data continues to play an important role in maintaining networks. For example, network telemetry data can be used for the diagnosis of network anomalies and/or network failures. Network telemetry data collection can be facilitated by cloud agents that can collect information regarding data traffic exchanged between network nodes.

Currently, tools to collect network telemetry can provide observability to some network telemetry. However, these tools focus on distinct data sources that have a similar scale to generate the network telemetry. In many cases, the network telemetry is visualized in a manner that obfuscates certain network events, particularly patterns in network events that occur at certain frequencies or intervals. It is possible that these obfuscated network events are not visible for use in the diagnosis of network anomalies and/or network failures.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example simplified procedure for concurrent visualization of time-series network metrics for correlation inference.

DESCRIPTION OF EXAMPLE EMBODIMENTS

Overview

According to one or more embodiments of the disclosure, a device obtains telemetry data indicative of a plurality of different types of events that occurred in a network. The device computes event counts for each of the plurality of different types of events within each of a sequence of predefined timespans based on the telemetry data and generates timeseries for each of the plurality of different types of events using the event counts. The device provides display data that causes a user interface to display a selected two or more of the timeseries concurrently.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
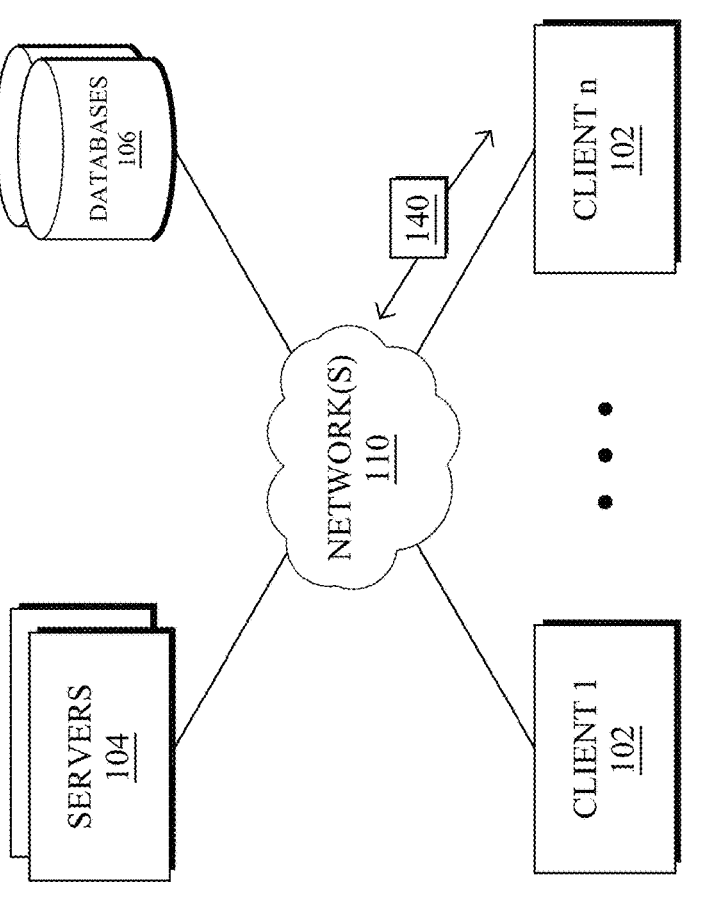

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
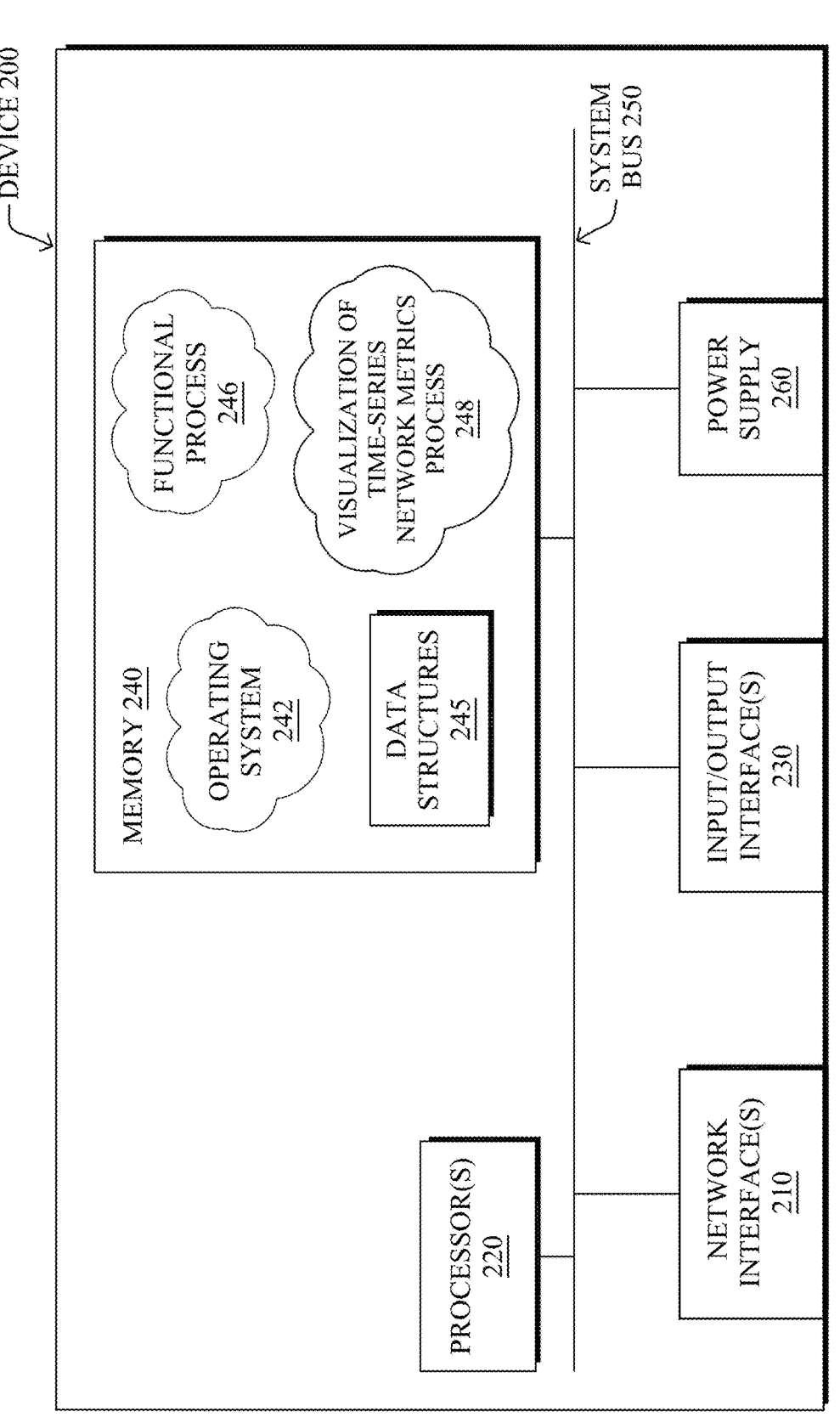
FIG. 2 illustrates an example computing device/node.

FIG. 2 is a schematic block diagram of an example node/device 200 (e.g., an apparatus) that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "visualization of time-series network metrics" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
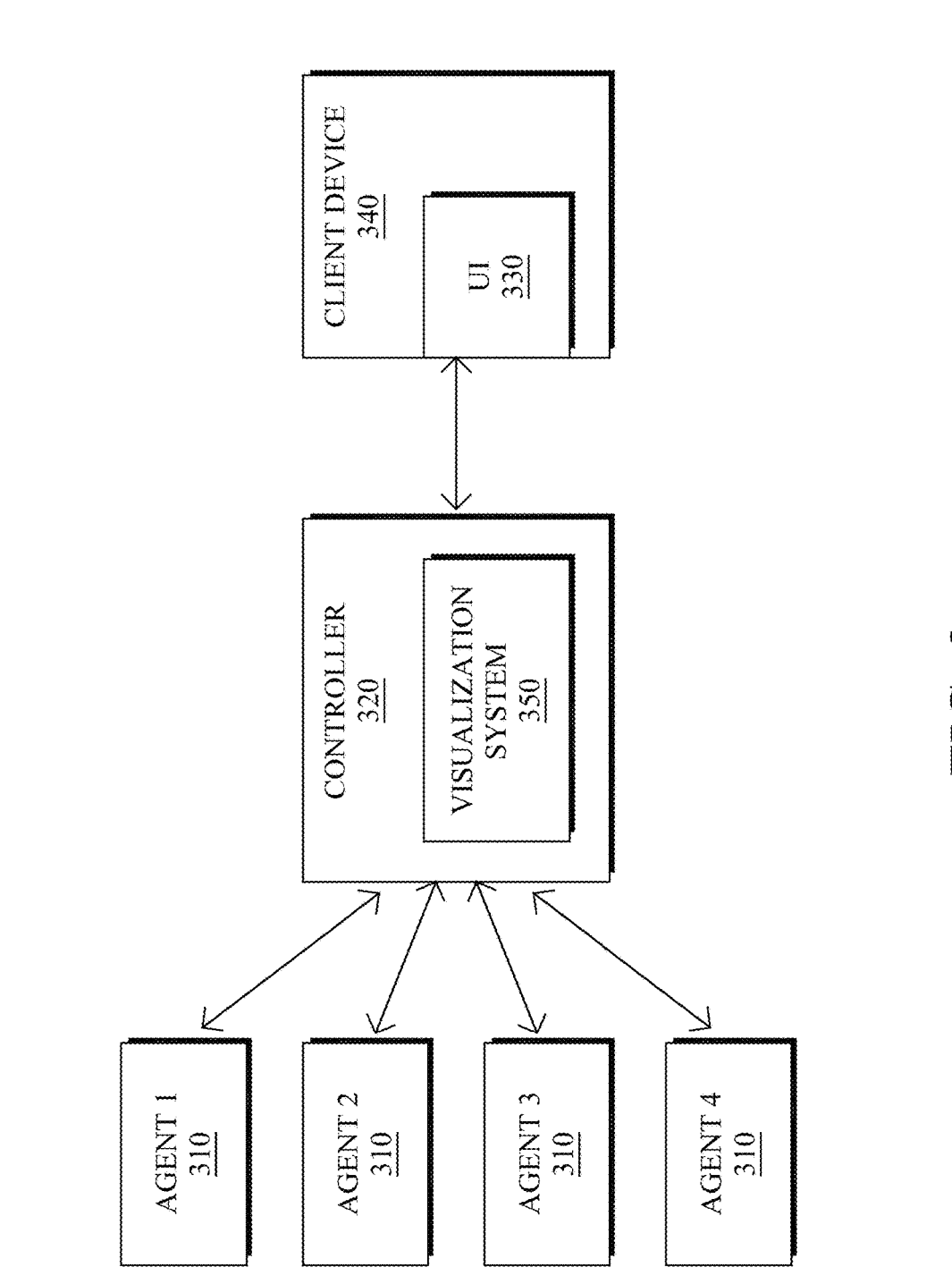
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the user interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

A key challenge that may arise in the above scenarios, and in visualization environments in general, is providing a simplified yet intuitive network observability workflow functionality by which concurrent visualization of time-series network telemetry from multiple disparate sources is provided to aid correlation inference. However, facilitation of comparative analytics between data sources with vastly different scales and latent temporal frequencies through a single-pane-of-glass view enables administrators to rapidly diagnose network failures and anomalies that are reported through different telemetry sources such as Syslogs, SNMP traps, wireless events, etc. that may be interdependent, correlated, or contemporaneous. Accordingly, the present disclosure allows for concurrent visualization of time-series network telemetry from multiple disparate sources to aid in correlation inference.

—Concurrent Visualization of Time-Series Network Metrics for Correlation Inference—

The techniques introduced herein allow for concurrent visualization of time-series network metrics for correlation inference. More specifically, the techniques herein provide a powerful yet intuitive network observability workflow that allows for concurrent visualization of time-series network telemetry from multiple disparate data sources. This allows for improved correlation inference in networks thereby improving the network in comparison to previous approaches.

As described in more detail, herein, various elements (e.g., visualizations provided by way of a graphical user interface, etc.) facilitate comparative analytics between disparate data sources with vastly different frequency scales and vastly different latent temporal frequencies through a single-pane-of-glass view. This allows for network administrators to rapidly diagnose network anomalies and/or network failures, etc. that are reported through different telemetry sources, such as Syslogs, Simple Network Management Protocol (SNMP) traps, wireless events, etc., all of which may be independent, correlated, or contemporaneous.

In various embodiments, a network observability tool is provided to users of the network. In some embodiments, a user interface (e.g., user interface 330 of FIG. 3) provides users with a concise overview of multiple (e.g., disparate) network telemetries to facilitate the embodiments described herein. For example, a user interface in accordance with the disclosure provides a user (e.g., a network administrator) with visual information that allows for correlation of network telemetry to efficiently diagnose network anomalies and/or network failures.

As described in more detail herein, the network observability tool provides various powerful elements to allow for correlation of network telemetry to efficiently diagnose network anomalies and/or network failures. For example, the network observability tool provides the ability to view the time-series of multiple metrics from many disparate telemetry sources concurrently through a single-pane-of-glass view. In such embodiments, the network observability tool displays data (e.g., telemetry) that is aligned in time. Further, the network observability tool of the present disclosure allows for user interaction that is temporarily synchronized across disparate data. In some embodiments, a tooltip is triggered by a mouse-over on one data source, which provides insights at a specific time-point, but also automatically provides similar tooltip insights over all other telemetries, thereby aiding the user with improved visibility to correlation inference within a network.

In various embodiments, comparatively large volumes of highly dimensional data (e.g., data having vastly different frequency scales and/or data having vastly different latent temporal frequencies) is dynamically aggregated using adaptive resolution time-bucketing techniques. These techniques can allow for time-series data to be aggregated and viewed with selectable and/or adaptive granularities ranging from minutes to months or even years. As described herein, providing observability to time-series data across relatively large temporal resolutions provides a user with a deeper understanding of temporal patterns in network telemetry that occur at different frequencies. Further, embodiments herein allow for temporal synchronization of multiple time-series, which can be especially useful when a user alters the onset and/or duration of a desired time window to better understand such temporal patterns in network telemetry.

The ability to re-arrange and reorder different telemetry sources so that they are adjacent, in accordance with the present disclosure, facilitates comparative analytics between metrics from different telemetry sources. To accommodate the vast differences in volume of events from different telemetry sources, data is aggregated in to heatmaps with dynamic scaling of individual metrics such that temporal patters that differ in scale by many orders of magnitude are clearly visible to a user. Accordingly, the disclosure provides a highly robust analytics tool for users and/or network administrators for viewing network telemetry and understanding the same.

Illustratively, the techniques described herein may be performed by hardware, software, and/or firmware, such as in accordance with visualization of time-series network metrics process 248, which may include computer executable instructions executed by the processor 220 (or independent processor of interfaces 210) to perform functions relating to the techniques described herein.

Specifically, according to various embodiments, a device obtains telemetry data indicative of a plurality of different types of events that occurred in a network. The device computes event counts for each of the plurality of different types of events within each of a sequence of predefined timespans based on the telemetry data and generates time-series for each of the plurality of different types of events using the event counts. The device provides display data that causes a user interface to display a selected two or more of the timeseries concurrently.

Various examples highlighting aspects of the present disclosure are provided below. It will be appreciated that the following examples are illustrative and are not intended to limit the scope of the disclosure but are provided to illustrate non-limiting examples of the methodologies described herein. One such example involves visualization of time-series Syslog events; another such example involves visualization of time-series network reachability events; and yet another example involves visualization of time-series radio events. It will be appreciated that these examples may be combined for concurrent visualization or may be provided for separate visualization in accordance with the disclosure.

Syslogs

Figure 4:
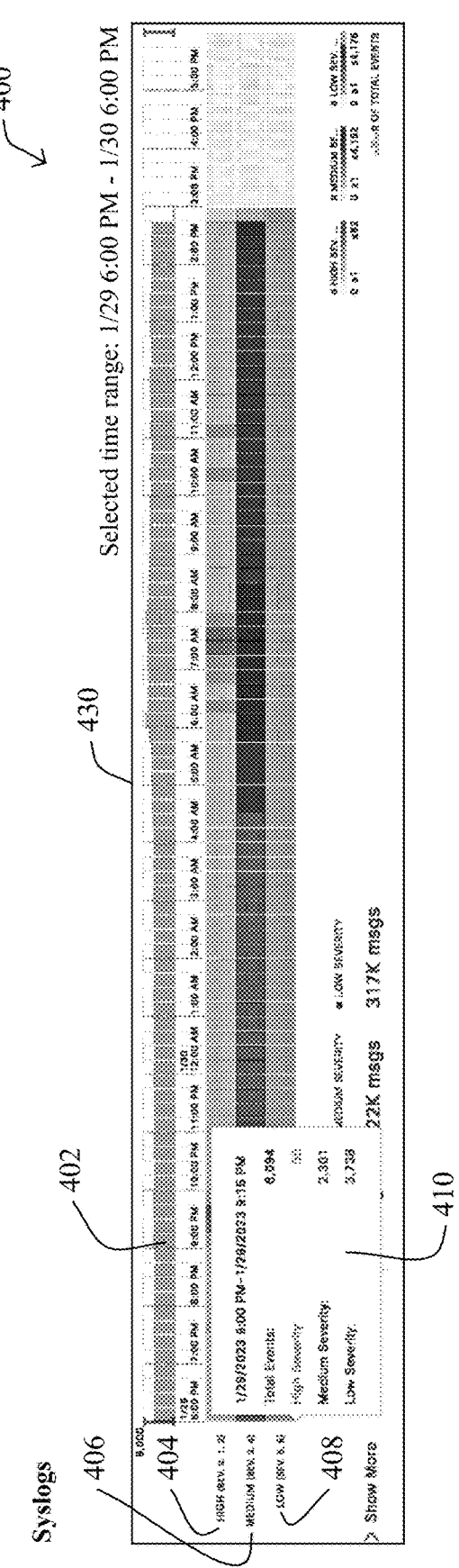
FIG. 4 illustrates an example visualization of time-series of network telemetry data.

Operationally, FIG. 4 illustrates an example visualization 400 of time-series of network telemetry data. The visualization 400 can be displayed on a user interface 430, which can be analogous to user interface 330 of FIG. 3. In some embodiments, the visualization 400 is displayed on the user interface 430 as a single-pane-of-glass. In the non-limiting example shown in FIG. 4, syslog events are monitored, tracked, and organized based on a determined severity (e.g., high severity 404 events, medium severity 406 events, low severity 408 events, etc.) associated with each network (e.g., syslog) event.

As will be appreciated, a "syslog event" generally refers to information contained within a notification message generated by a syslog agent. Such messages can include a timestamp, a severity rating, a device ID (including IP address), and/or information specific to the event. Accordingly, if a syslog notification message includes information indicating that the syslog event is generally of low severity, it will be flagged as a low severity 408 event, while if the syslog event is generally of high severity, it will be flagged as a high severity 404 event. Syslog events that neither qualify as "low severity" events nor "high severity" events are flagged as medium severity 406 events.

The visualization 400 is broken into a plurality of time windows (e.g., time buckets) over, in the non-limiting example illustrated in FIG. 4, a twenty-four hour time period. Each of these time windows (illustrated as the blocks disposed along a horizontal axis with respect to FIG. 4) can be selected by, for example, a user for further inspection. Although the time windows are illustrated in FIG. 4 as being fifteen minute intervals, embodiments are not limited to this particular example and other time windows are contemplated within the scope of the disclosure. Once a time window is selected, a pop out interface 410 is displayed (e.g., in response to a mouse-over of the time window) showing detailed network telemetry over the course of the selected time window. For example, as shown in FIG. 4, the pop out interface 410 can display network events that occurred in the selected time window based on severity (e.g., high severity 404 events, medium severity 406 events, low severity 408 events, etc.).

As shown in FIG. 4, a relatively large volume of network telemetry data is dynamically aggregated and organized for viewing at each of the time windows (e.g., time buckets). This is important because temporal patterns in network telemetry occur at different frequencies. The aforementioned temporal synchronization of the multiple time-series charts can be pertinent when changing the desired onset and/or duration of the desired time-window. The ability to re-arrange and reorder different telemetry sources so that they are adjacent (e.g., within the visualization 400) facilitates comparative analytics between metrics from different telemetry sources. To accommodate the vast differences in volume of events from different telemetry sources, the telemetry data is aggregated in to heatmaps with dynamic scaling of individual metrics such that temporal patters that differ in scale by many orders of magnitude are clearly visible.

Reachability

Figure 5:
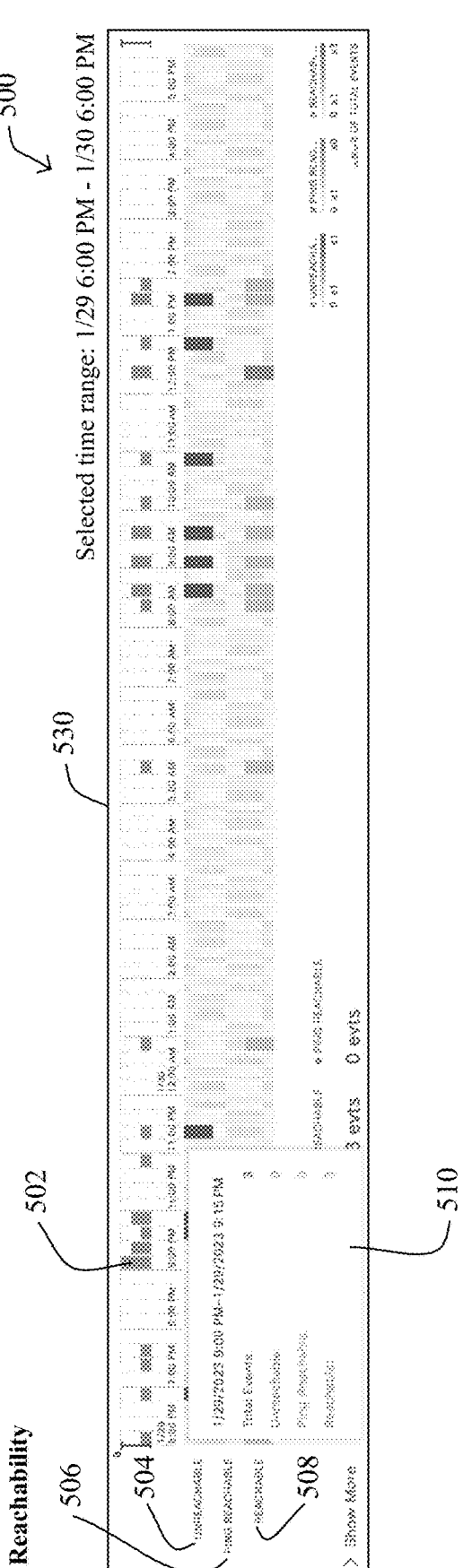
FIG. 5 illustrates another example visualization of time-series of network telemetry data.

Operationally, FIG. 5 illustrates another example visualization 500 of time-series of network telemetry data. The visualization 500 can be displayed on a user interface 530, which can be analogous to user interface 330 of FIG. 3. In some embodiments, the visualization 500 is displayed on the user interface 530 as a single-pane-of-glass. In the non-limiting example shown in FIG. 5, reachability events are monitored, tracked, and organized based on a determined reachability (e.g., reachable 504, ping reachable 506, unreachable 508, etc.) associated with network devices in the network.

As will be appreciated, "reachability" generally refers to the ability of a network device to see and/or communicate with another network device in the same network. Accordingly, if a network device is reachable 504, it generally means that the network device is visible to and communicating with other network devices in the network. If the network device is ping reachable 506, it generally means that the network device can be pinged and will return a message in response to a ping. Finally, if the network device is unreachable 508, it generally means that the network device is not visible to and is not communicating with ither network devices in the network.

Similar to the visualization 400 of FIG. 4, the visualization 500 of FIG. 5 is broken into a plurality of time windows (e.g., time buckets) over, in the non-limiting example illustrated in FIG. 5, a twenty-four hour time period. Each of these time windows (illustrated as the blocks disposed along a horizontal axis with respect to FIG. 5) can be selected by, for example, a user for further inspection. Although the time windows are illustrated in FIG. 5 as being fifteen minute intervals, embodiments are not limited to this particular example and other time windows are contemplated within the scope of the disclosure. Once a time window is selected (e.g., in response to a mouse-over of the time window), a pop out interface 510 is displayed showing detailed network telemetry over the course of the selected time window. For example, as shown in FIG. 5, the pop out interface 510 can display network events that occurred in the selected time window based on a determined reachability (e.g., reachable 504, ping reachable 506, unreachable 508, etc.) associated with network devices in the network.

As shown in FIG. 5, a relatively large volume of network telemetry data is dynamically aggregated and organized for viewing at each of the time windows (e.g., time buckets). This is important because temporal patterns in network telemetry occur at different frequencies. The aforementioned temporal synchronization of the multiple time-series charts can be pertinent when changing the desired onset and/or duration of the desired time-window. The ability to re-arrange and reorder different telemetry sources so that they are adjacent (e.g., within the visualization 500) facilitates comparative analytics between metrics from different telemetry sources. To accommodate the vast differences in volume of events from different telemetry sources, the telemetry data is aggregated in to heatmaps with dynamic scaling of individual metrics such that temporal patters that differ in scale by many orders of magnitude are clearly visible.

Radio Events

Figure 6:
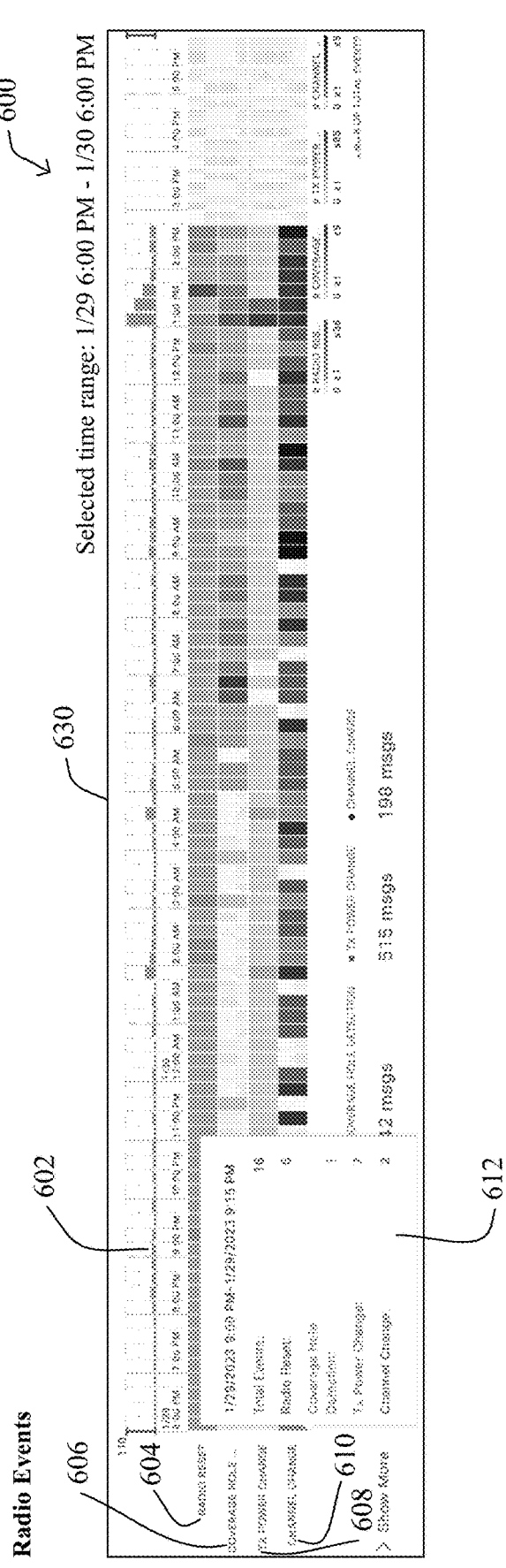
FIG. 6 illustrates yet another example visualization 600 of time-series of network telemetry data.

Operationally, FIG. 6 illustrates yet another example visualization 600 of time-series of network telemetry data. The visualization 600 can be displayed on a user interface 630, which can be analogous to user interface 330 of FIG. 3. In some embodiments, the visualization 600 is displayed on the user interface 630 as a single-pane-of-glass. In the non-limiting example shown in FIG. 6, radio events are monitored, tracked, and organized based on various metrics associated with the occurrence of network events (e.g., radio reset 604 event, coverage hole detection 606 event, transmission power change 608 event, channel change 610 event, etc.) associated with network devices in the network.

As will be appreciated, a "radio event" generally refers to information corresponding to a network radio and/or the behavior of said radio. Accordingly, if a radio in the network has been reset, a notification indicating a radio reset 604 event has occurred is generated and displayed in the visualization 600. Similarly, if a radio coverage hole is detected (e.g., coverage hole detection 606 event is detected), a notification indicating a coverage hole detection 606 event has occurred is generated and displayed in the visualization 600. Further, if a change in transmission power from a radio is detected (e.g., transmission power change 608 event is detected), a notification indicating a transmission power change 608 event has occurred is generated and displayed in the visualization 600 and, if a change in a channel from a radio is detected (e.g., channel change 610 event is detected), a notification indicating a channel change 610 event has occurred is generated and displayed in the visualization 600.

Similar to the visualization 400 of FIG. 4 and the visualization 500 of FIG. 5, the visualization 600 of FIG. 6 is broken into a plurality of time windows (e.g., time buckets) over, in the non-limiting example illustrated in FIG. 6, a twenty-four hour time period. Each of these time windows (illustrated as the blocks disposed along a horizontal axis with respect to FIG. 6) can be selected by, for example, a user for further inspection. Although the time windows are illustrated in FIG. 6 as being fifteen minute intervals, embodiments are not limited to this particular example and other time windows are contemplated within the scope of the disclosure. Once a time window is selected (e.g., in response to a mouse-over of the time window), a pop out interface 612 is displayed showing detailed network telemetry over the course of the selected time window. For example, as shown in FIG. 6, the pop out interface 612 can display network events that occurred in the selected time window based on various metrics associated with the occurrence of network events (e.g., radio reset 604 event, coverage hole detection 606 event, transmission power change 608 event, channel change 610 event, etc.) associated with network devices in the network.

As shown in FIG. 6, a relatively large volume of network telemetry data is dynamically aggregated and organized for viewing at each of the time windows (e.g., time buckets). This is important because temporal patterns in network telemetry occur at different frequencies. The aforementioned temporal synchronization of the multiple time-series charts can be pertinent when changing the desired onset and/or duration of the desired time-window. The ability to re-arrange and reorder different telemetry sources so that they are adjacent (e.g., within the visualization 600) facilitates comparative analytics between metrics from different telemetry sources. To accommodate the vast differences in volume of events from different telemetry sources, the telemetry data is aggregated in to heatmaps with dynamic scaling of individual metrics such that temporal patters that differ in scale by many orders of magnitude are clearly visible.

It will be appreciated that the visualization 400, 500, and 600 of FIG. 4, FIG. 5, and FIG. 6 can be displayed concurrently within a single-pane-of-glass, independently in separate panes-of-glass, or combinations thereof. For example, the visualization 400 and the visualization 500 can be displayed concurrently in a single-pane-of-glass, the visualization 500 and the visualization 600 can be displayed concurrently in a single-pane-of-glass, the visualization 400 and the visualization 600 can be displayed concurrently in a single-pane-of-glass, or the visualization 400, the visualization 500, and the visualization 600 can be displayed concurrently in a single-pane-of-glass, etc. In some embodiments, which visualizations are concurrently displayed is responsive to receipt of a command from a user (e.g., a system administrator).

FIG. 7 illustrates an example simplified procedure 700 (e.g., a method) for concurrent visualization of time-series network metrics for correlation inference. For example, a non-generic, specifically configured device for concurrent visualization of time-series network metrics for correlation inference (e.g., device 200), may perform procedure 700 by executing stored instructions (e.g., visualization of time-series network metrics process 248). The procedure 700 may start at step 705, and continues to step 710, where, as described in greater detail above, the device (e.g., a controller, processor, etc.) may obtain telemetry data indicative of a plurality of different types of events that occurred in a network. The telemetry data can include Simple Network Management Protocol (SNMP) traps, as discussed above.

In various embodiments, the plurality of different types of events may include wireless networking events associated with one or more wireless access points in the network. As discussed above, the wireless networking events may include one or more of a radio reset, detection of a coverage hole, a transmission power change, or a channel change, or any combination thereof. In various embodiments, the plurality of different types of events may correspond to different severity levels for the events.

At step 715, as detailed above, the device may compute, based on the telemetry data, event counts for each of the plurality of different types of events within each of a sequence of predefined timespans.

At step 720, the device may generate timeseries for each of the plurality of different types of events using the event counts. The timeseries may be analogous to the timeseries illustrated in FIGS. 4-6, herein. In various embodiments, the sequence of predefined timespans can be computed based on the telemetry data.

At step 725, as detailed above, the device may provide display data that causes a user interface to display a selected two or more of the timeseries concurrently. In various embodiments, the user interface may be configured to allow a user to rearrange the selected two or more of the timeseries. In addition to, or in the alternative, the display data may cause the user interface to represent the selected two or more of the timeseries as heatmaps that represent their respective event counts for each of the sequence of predefined timespans. Further, in various embodiments, the display data may indicate a correlation between the selected two or more of the timeseries. Moreover, in various embodiments, the procedure 700 can include adjusting, by the device, the sequence of predefined timespans based on input from the user interface.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for concurrent visualization of time-series network metrics for correlation inference. More specifically, by computing event counts for each of the plurality of different types of events within each of a sequence of predefined timespans, generating timeseries for each of the plurality of different types of events using the event counts and providing display data that causes a user interface to display a selected two or more of the timeseries concurrently, a powerful yet intuitive network observability workflow consisting of the concurrent visualization of time-series network telemetry from multiple disparate sources to aid correlation inference is provided.

While there have been shown and described illustrative embodiments that provide for concurrent visualization of time-series network metrics for correlation inference, it is to be understood that various other adaptations and modifications may be made within the intent and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    obtaining, by a device, telemetry data indicative of a plurality of different types of events that occurred in a network;
    computing, by the device and based on the telemetry data, event counts for each of the plurality of different types of events within each of a sequence of predefined timespans;
    generating, by the device, timeseries for each of the plurality of different types of events using the event counts; and
    providing, by the device, display data that causes a user interface to display a selected two or more of the timeseries concurrently, wherein the display data causes the user interface to represent the selected two or more of the timeseries as heatmaps that represent their respective event counts for each of the sequence of predefined timespans.

2. The method of claim 1, wherein the plurality of different types of events comprises wireless networking events associated with one or more wireless access points in the network.

3. The method of claim 2, wherein the wireless networking events comprise one or more of: a radio reset, detection of a coverage hole, a transmission power change, or a channel change.

4. The method of claim 1, wherein the user interface is configured to allow a user to rearrange the selected two or more of the timeseries.

5. The method of claim 1, further comprising:
    computing, by the device, the sequence of predefined timespans based on the telemetry data.

6. The method of claim 1, further comprising:
    adjusting, by the device, the sequence of predefined timespans based on input from the user interface.

7. The method of claim 1, wherein the plurality of different types of events correspond to different severity levels for the events.

8. The method of claim 1, wherein the display data indicates a correlation between the selected two or more of the timeseries.

9. The method of claim 1, wherein the telemetry data comprises Simple Network Management Protocol (SNMP) traps.

10. An apparatus, comprising:
    one or more network interfaces to communicate with a network;
    a processor coupled to the one or more network interfaces and configured to execute one or more processes; and
    a memory configured to store a process that is executable by the processor, the process, when executed, configured to:
    obtain telemetry data indicative of a plurality of different types of events that occurred in a network;
    compute, based on the telemetry data, event counts for each of the plurality of different types of events within each of a sequence of predefined timespans;
    generate timeseries for each of the plurality of different types of events using the event counts; and
    provide display data that causes a user interface to display a selected two or more of the timeseries concurrently, wherein the display data causes the user interface to represent the selected two or more of the timeseries as heatmaps that represent their respective event counts for each of the sequence of predefined timespans.

11. The apparatus of claim 10, wherein the plurality of different types of events comprises wireless networking events associated with one or more wireless access points in the network.

12. The apparatus of claim 11, wherein the plurality of different types of events comprise one or more of: a radio reset, detection of a coverage hole, a transmission power change, or a channel change.

13. The apparatus of claim 10, wherein the user interface is configured to allow a user to rearrange the selected two or more of the timeseries.

14. The apparatus of claim 10, wherein the processor executes the process to: compute the sequence of predefined timespans based on the telemetry data; and
    adjust the sequence of predefined timespans based on input from the user interface.

15. The apparatus of claim 10, wherein the plurality of different types of events correspond to different severity levels for the events.

16. The apparatus of claim 10, wherein the display data indicates a correlation between the selected two or more of the timeseries.

17. The apparatus of claim 10, wherein the telemetry data comprises Simple Network Management Protocol (SNMP) traps.

18. A tangible, non-transitory, computer-readable medium storing program instructions that cause a device to execute a process comprising:

obtaining, by a device, telemetry data indicative of a plurality of different types of events that occurred in a network;

computing, by the device and based on the telemetry data, event counts for each of the plurality of different types of events within each of a sequence of predefined timespans;

generating, by the device, timeseries for each of the plurality of different types of events using the event counts; and providing, by the device, display data that causes a user interface to display a selected two or more of the timeseries concurrently, wherein the display data causes the user interface to represent the selected two or more of the timeseries as heatmaps that represent their respective event counts for each of the sequence of predefined timespans.

* * * * *